US011294986B2

(12) United States Patent
Mezzacapo et al.

(10) Patent No.: US 11,294,986 B2
(45) Date of Patent: Apr. 5, 2022

(54) ITERATIVE ENERGY-SCALED VARIATIONAL QUANTUM EIGENSOLVER

(71) Applicant: International Business Machines Corporation, Armonk, NY (US)

(72) Inventors: Antonio Mezzacapo, Westchester, NY (US); Richard Chen, Mount Kisco, NY (US); Marco Pistoia, Amawalk, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 272 days.

(21) Appl. No.: 16/691,941

(22) Filed: Nov. 22, 2019

(65) Prior Publication Data
US 2021/0157877 A1 May 27, 2021

(51) Int. Cl.
*G06F 17/16* (2006.01)
*G06N 10/00* (2022.01)

(52) U.S. Cl.
CPC ............. *G06F 17/16* (2013.01); *G06N 10/00* (2019.01)

(58) Field of Classification Search
CPC ................................ G06F 17/16; G06N 10/00
USPC ........................................................ 708/520
See application file for complete search history.

(56) References Cited

U.S. PATENT DOCUMENTS 10,311,370 B2   6/2019  Bravyi et al.
11,106,993 B1*  8/2021  Dallaire-Demers ... G06N 5/003
2018/0096085 A1  4/2018  Rubin
2018/0165601 A1  6/2018  Wiebe
2019/0095811 A1  3/2019  Mezzacapo et al.
2020/0293935 A1*  9/2020  Greenberg ............... G06N 7/08

FOREIGN PATENT DOCUMENTS

GB          201801517         3/2018

OTHER PUBLICATIONS

Kandala, et al. "Hardware-efficient Variational Quantum Eigensolver for Small Molecules and Quantum Magnets." Nature 549, 242 (2017), 5 pages.
Bravyi, et al. "Tapering off qubits to simulate fermionic Hamiltonians." arXiv:1701.08213v1 [quant-ph] Jan. 27, 2017. 15 pages.
(Continued)

*Primary Examiner* — Tan V Mai
(74) *Attorney, Agent, or Firm* — Amin, Turocy & Watson, LLP

(57) ABSTRACT

Techniques regarding an iterative energy-scaled variational quantum eigensolver process are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise a read-out component that determines a ground state energy value of a quantum Hamiltonian by employing a variational quantum eigensolver (VQE) algorithm, wherein VQE algorithm utilizes a symmetry that emerges at an energy scale of the quantum Hamiltonian.

25 Claims, 12 Drawing Sheets

(56) References Cited

OTHER PUBLICATIONS

Moll, et al. "Quantum optimization using variational algorithms on near-term quantum devices" Quantum Sci. Technol. 3 (2018) 030503, https://doi.org/10.1088/2058-9565/aab822. 18 pages.

Mell et al., "The NIST Definition of Cloud Computing," Recommendations of the National Institute of Standards and Technology, NIST Special Publication 800-145, Sep. 2011, 7 pages.

\* cited by examiner

500 

Input: A qubit Hamiltonian expressed as a linear combination of Pauli operators $H = \sum_i \alpha_i P_i$, an ordered list of $N+1$ positive real energies $\varepsilon_0, \varepsilon_1, ... \varepsilon_N$, $\varepsilon_0 > \varepsilon_1 > \varepsilon_2 > ... > \varepsilon_{N-1} > \varepsilon_N$, with $\varepsilon_0 > |\alpha_i| \forall i$.

1: Define $N$ truncated hamiltonians $H_{\varepsilon_{i-1}, \varepsilon_i} = \sum_j \alpha_i P_i$, where $\varepsilon_i < |\alpha_i| < \varepsilon_{i-1}$.
2: Find $k_i$ $Z_2$ symmetries $s_{i,1} ... s_{i,k_i}$ for each $H_{\varepsilon_{i-1}, \varepsilon_i}$
3: Find $k_i$ Clifford unitaries $C_{i,1} ... C_{i,k_i}$ based on the $s_{i,1} ... s_{i,k_i}$ symmetries
4: Compute and store $N$ block-diagonalized Hamiltonians $H^{BD}_{\varepsilon_{i-1}, \varepsilon_i} = (\prod_{j=1}^{k_i} C_{ij}) H_{\varepsilon_{i-1}, \varepsilon_i} (\prod_{j=1}^{k_i} C_{ij})$
5: Define $N$ variational wavefunctions $|\psi_i(\theta_i)\rangle$ that act as single-qubit rotations on the qubits that define the blocks of the Hamiltonian $H^{BD}_{\varepsilon_{i-1}, \varepsilon_i}$. The variational parameters $\theta_i$ can be initialized to reproduce the previous-step wavefunction $|\psi_{i-1}(\theta_{i-1})\rangle$, for any values of $\theta_{i-1}$. We dub the parameters initialized in this way as $\theta_i^0 \equiv \text{Embed}[\theta_{i-1}]$.
6: Execute VQE to find the best $\theta_1^*$ for the variational wavefunction $|\psi_1(\theta_1)\rangle$ for the Hamiltonian $H^{BD}_{\varepsilon_0, \varepsilon_1}$
7: for i=2 to N do
8:    Compute the embedded initial parameters $\theta_i^0 \equiv \text{Embed}[\theta_{i-1}^*]$
9:    Define a subset $C'_{ij}$ of symmetries of $H_{\varepsilon_{i-1}, \varepsilon_i}$ that are not symmetries of $H_{\varepsilon_{i-2}, \varepsilon_{i-1}}$
10:    Run VQE to find $\theta_i^* = \text{argmin}_{\theta_i} \langle \psi(\theta_i)|(\prod_j C'_{ij}) H^{BD}_{\varepsilon_{i-1}, \varepsilon_i} (\prod_j C'_{ij})|\psi(\theta_i)\rangle$, with the initial conditions $\theta_i^0$
11:    Compute $E_i^* = \langle \psi(\theta_i^*)|(\prod_j C'_{ij}) H^{BD}_{\varepsilon_{i-1}, \varepsilon_i} (\prod_j C'_{ij})|\psi(\theta_i^*)\rangle$
12: end for
13: return $E_N^*$

FIG. 5

ITERATIVE ENERGY-SCALED
VARIATIONAL QUANTUM EIGENSOLVER

BACKGROUND

The subject disclosure relates to an iterative energy-scaled variational quantum eigensolver, and more specifically, to a modified variational quantum eigensolver process that can determine a ground state of quantum Hamiltonian using one or more symmetries that emerge at various energy scales.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can regard an iterative energy-scaled variational quantum eigensolver are described.

According to an embodiment, a system is provided. The system can comprise a memory that stores computer executable components. The system can also comprise a processor, operably coupled to the memory, and that can execute the computer executable components stored in the memory. The computer executable components can comprise a read-out component that can determine a ground state energy value of a quantum Hamiltonian by employing a variational quantum eigensolver (VQE) algorithm. The VQE algorithm can utilize a symmetry that emerges at an energy scale of the quantum Hamiltonian.

According to another embodiment, a system is provided. The system can comprise a memory that stores computer executable components. The system can also comprise a processor, operably coupled to the memory, and that can execute the computer executable components stored in the memory. The computer executable components can comprise a read-out component that that can determine a ground state energy value of a quantum Hamiltonian by employing a variational quantum eigensolver (VQE) algorithm to optimize a variational quantum parameter based on a $Z_2$ symmetry that emerges at an energy scale of the quantum Hamiltonian.

According to an embodiment, a computer-implemented method is provided. The computer-implemented method can comprise determining, by a system operatively coupled to a processor, a ground state energy value of a quantum Hamiltonian by employing a variational quantum eigensolver (VQE) algorithm. The VQE algorithm can utilize a symmetry that emerges at an energy scale of the quantum Hamiltonian.

According to another embodiment, a computer-implemented method is provided. The computer-implemented method can comprise determining, by a system operatively coupled to a processor, a ground state energy value of a quantum Hamiltonian by employing a variational quantum eigensolver (VQE) algorithm to optimize a variational quantum parameter based on a $Z_2$ symmetry that emerges at an energy scale of the quantum Hamiltonian.

According to an embodiment, a computer program product for estimating a ground state energy for a quantum Hamiltonian is provided. The computer program product can comprise a computer readable storage medium having program instructions embodied therewith. The program instructions can be executable by a processor to cause the processor to estimate, by the processor, the ground state energy by employing a variational quantum eigensolver (VQE) algorithm that can use a set of embedded variational ansatzes computed based on a plurality of $Z_2$ symmetries that emerge at a plurality of energy scales of the quantum Hamiltonian.

BRIEF DESCRIPTION OF THE DRAWINGS

FIG. 5 illustrates a diagram of an example, non-limiting formula that can characterize execution of one or more iterative energy-scaled VQE processes in accordance with one or more embodiments described herein.

DETAILED DESCRIPTION

Figure 1:
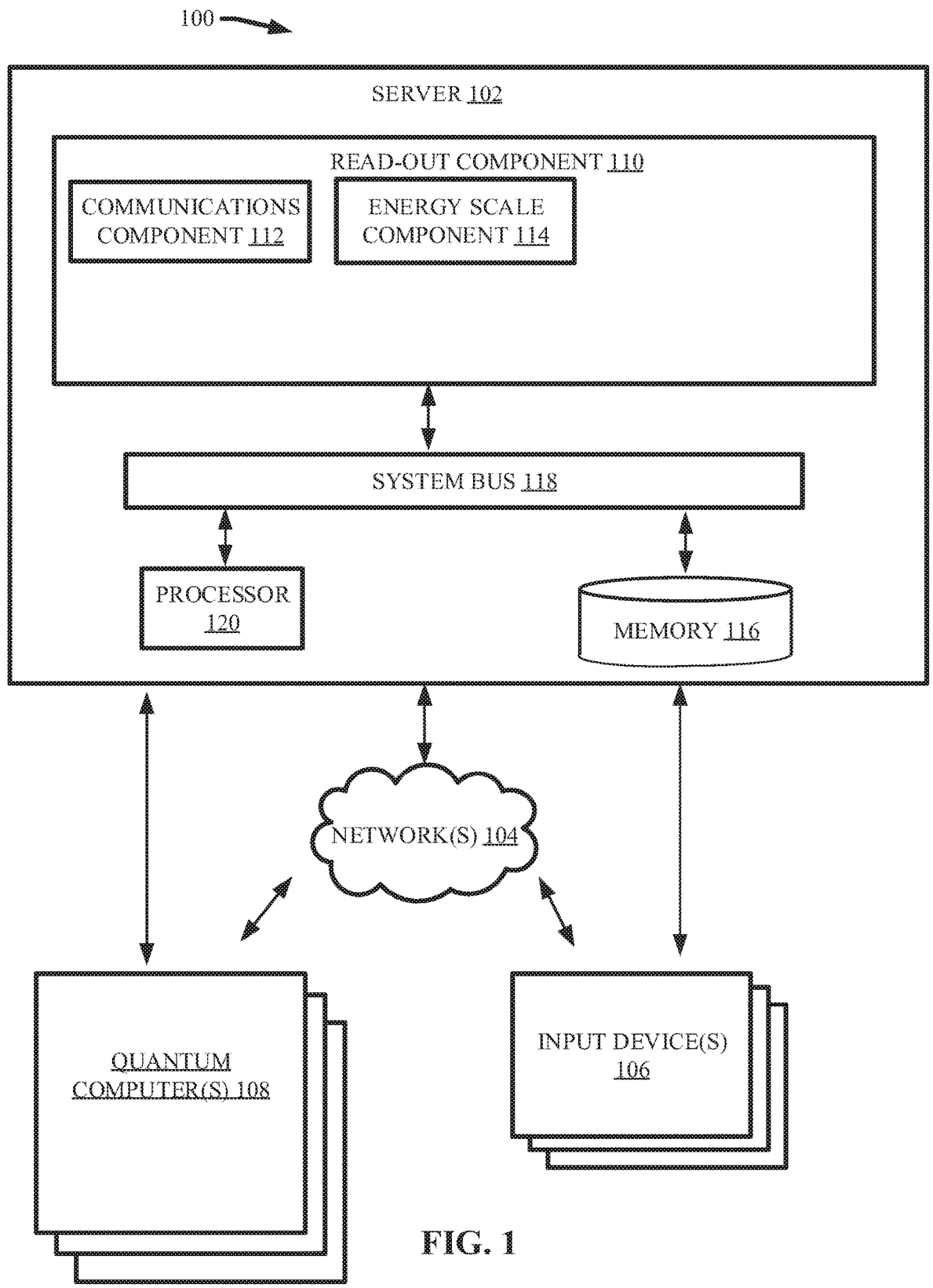
FIG. 1 illustrates a block diagram of an example, non-limiting system that can implement an iterative energy-scaled based variational quantum eigensolver ("VQE") process to determine a ground state energy of a quantum qubit in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

VQEs are a category of hybrid quantum-classical algorithms designed to construct ground states and/or compute ground state energies of quantum Hamiltonians. For example, VQEs can be utilized to solve for the ground state energy of many-body interacting fermionic Hamiltonians. For instance, VQEs can be utilized with regards to quantum chemistry, material science, and nuclear physics applications. VQEs can utilize a quantum computer to prepare variational trial states that depend on a set of parameters. Then expectation values of the energy can be estimated and used by one or more classical optimizers to generate a new set of improved parameters, which that can serve as the basis for computing the ground state energies.

Various embodiments of the present invention can be directed to computer processing systems, computer-implemented methods, apparatus and/or computer program products that facilitate the efficient, effective, and autonomous (e.g., without direct human guidance) iterative energy-scaled VQE processes that can improve upon the accuracy and efficiency of conventional VQEs. For example, one or more embodiments described herein can compute symmetries for a target quantum Hamiltonians that are truncated at one or more energy thresholds. Additionally, the truncated quantum Hamiltonians can be block-diagonalized based on the symmetries, wherein the block-diagonalized quantum Hamiltonians can be used to build ground states through one or more VQE processes. In various embodiments, the VQE processes can be used in an iterative scheme such that the variational quantum parameters outputted by a first VQE (e.g., regarding a block-diagonalized quantum Hamiltonian at a first energy scale) can be used as starting parameters for a second VQE (e.g., regarding a block-diagonalized quantum Hamiltonian at a second energy scale). Thereby, an iterative VQE procedure on the truncated, block-diagonalized quantum Hamiltonians can generate optimal variation quantum parameters that can be utilized as ansatzes for a VQE applied to the target quantum Hamiltonian to determine a ground state energy.

The computer processing systems, computer-implemented methods, apparatus and/or computer program products employ hardware and/or software to solve problems that are highly technical in nature (e.g., an iterative energy-scaled VQE procedure), that are not abstract and cannot be performed as a set of mental acts by a human. For example, an individual, or multiple individuals, cannot leverage quantum phenomena, such as superposition and/or quantum entanglement, to determine the ground state of one or more quantum Hamiltonians. Various embodiments described herein can constitute a technical improvement over conventional VQE procedures by exploiting one or more symmetries that emerge at various energy scales of quantum Hamiltonians to improve an estimation ground state energies and/or reduce quantum resources, such as the number of required qubits for operation, sampling time, and/or the number of function calls required in a classical optimizer.

One or more embodiments described herein can be employed in a practical application to prepare low-energy states and/or estimate the ground energy of quantum Hamiltonians (e.g., in the context of quantum chemistry, material science, and/or nuclear physics).

FIG. 1 illustrates a block diagram of an example, non-limiting system 100 that can implement one or more iterative energy-scaled VQE procedure. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations described.

As shown in FIG. 1, the system 100 can comprise one or more servers 102, one or more networks 104, input devices 106, and/or quantum computers 108. The server 102 can comprise read-out component 110. The read-out component 110 can further comprise communications component 112 and/or energy scale component 114. Also, the server 102 can comprise or otherwise be associated with at least one memory 116. The server 102 can further comprise a system bus 118 that can couple to various components such as, but not limited to, the read-out component 110 and associated components, memory 116 and/or a processor 120. While a server 102 is illustrated in FIG. 1, in other embodiments, multiple devices of various types can be associated with or comprise the features shown in FIG. 1. Further, the server 102 can communicate with one or more cloud computing environments.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106 and/or quantum computers 108 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the read-out component 110 can be provided on the one or more servers 102, it should be appreciated that the architecture of system 100 is not so limited. For example, the read-out component 110, or one or more components of the read-out component 110, can be located at another computer device, such as another server device, a client device, etc.

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. A user of the system 100 can utilize the one or more input devices 106 to input one or more target quantum Hamiltonians into the system 100, thereby sharing (e.g., via a direct connection and/or via the one or more networks 104) said data with the server 102. For example, the one or more input devices 106 can send data to the communications component 112 (e.g., via a direct connection and/or via the one or more networks 104). Additionally, the one or more input devices 106 can comprise one or more displays that can present one or more outputs generated by the system 100 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

A user of the system 100 can utilize the one or more input devices 106 and/or the one or more networks 104 to input one or more settings and/or commands into the system 100. For example, in the various embodiments described herein, a user of the system 100 can operate and/or manipulate the server 102 and/or associate components via the one or more input devices 106. Additionally, a user of the system 100 can utilize the one or more input devices 106 to display one or more outputs (e.g., displays, data, visualizations, and/or the like) generated by the server 102 and/or associate components. Further, in one or more embodiments, the one or more input devices 106 can be comprised within, and/or operably coupled to, a cloud computing environment.

For example, in various embodiments the one or more input devices 106 can be employed to enter one or more target quantum Hamiltonians into the system 100 for analysis via one or more iterative energy-scaled VQE procedures. For example, the target quantum Hamiltonian can comprise a sum of Pauli matrices and/or can be obtained by applying one or more versions of a Jordan-Wigner encoding. For instance, in one or more embodiments the target quantum Hamiltonians can be fermionic Hamiltonians that can characterize one or more molecular structures. The one or more target quantum Hamiltonians can be expressed as a linear combination of Pauli operators $H=\Sigma_i \alpha_i P_i$ (e.g., for an iteration i). Additionally, in various embodiments the one or more input devices 106 can be employed to enter one or more energy thresholds regarding the one or more target quantum Hamiltonians, such as an ordered list of N+1 positive real energies $\varepsilon_0, \varepsilon_1, \ldots \varepsilon_N, \varepsilon_0 > \varepsilon_1 > \ldots > \varepsilon_{N-1}$, with $\varepsilon > |\alpha_i| \forall i$. For example, the one or more energy thresholds can delineate various energy scales comprised within the one or more target quantum Hamiltonians.

In various embodiments, the one or more quantum computers 108 can comprise quantum hardware devices that can utilize the laws of quantum mechanics (e.g., such as superposition and/or quantum entanglement) to facilitate computational processing (e.g., while satisfying the DiVincenzo criteria). In one or more embodiments, the one or more quantum computers 108 can comprise a quantum data plane, a control processor plane, a control and measurement plane, and/or a qubit technology.

In one or more embodiments, the quantum data plane can include one or more quantum circuits comprising physical qubits, structures to secure the positioning of the qubits, and/or support circuitry. The support circuitry can, for example, facilitate measurement of the qubits' state and/or perform gate operations on the qubits (e.g., for a gate-based system). In some embodiments, the support circuitry can comprise a wiring network that can enable multiple qubits to interact with each other. Further, the wiring network can facilitate the transmission of control signals via a direct electrical connection and/or electromagnetic radiation (e.g., optical, microwave, and/or low-frequency signals). For instance, the support circuitry can comprise one or more superconducting resonators operatively coupled to the one or more qubits. As described herein the term "superconducting" can characterize a material that exhibits superconducting properties at or below a superconducting critical temperature, such as aluminum (e.g., superconducting critical temperature of 1.2 Kelvin) or niobium (e.g., superconducting critical temperature of 9.3 Kelvin). Additionally, one of ordinary skill in the art will recognize that other superconductor materials (e.g., hydride superconductors, such as lithium/magnesium hydride alloys) can be used in the various embodiments described herein.

In one or more embodiments, the control processor plane can identify and/or trigger a Hamiltonian sequence of quantum gate operations and/or measurements, wherein the sequence executes a program (e.g., provided by a host processor, such as server 102, via read-out component 110) for implementing a quantum algorithm (e.g., a VQE algorithm). For example, the control processor plane can convert compiled code to commands for the control and measurement plane. In one or more embodiments, the control processor plane can further execute one or more quantum error correction algorithms.

In one or more embodiments, the control and measurement plane can convert digital signals generated by the control processor plane, which can delineate quantum operations to be performed, into analog control signals to perform the operations on the one or more qubits in the quantum data plane. Also, the control and measurement plane can convert one or more analog measurement outputs of the qubits in the data plane to classical binary data that can be shared with other components of the system 100 (e.g., such as the read-out component 110, via, for example, the control processor plane).

One of ordinary skill in the art will recognize that a variety of qubit technologies can provide the basis for the one or more qubits of the one or more quantum computers 108. Two exemplary qubit technologies can include trapped ion qubits and/or superconducting qubits. For instance, wherein the quantum computer 108 utilizes trapped ion qubits, the quantum data plane can comprise a plurality of ions serving as qubits and one or more traps that serve to hold the ions in specific locations. Further, the control and measurement plane can include: a laser or microwave source directed at one or more of the ions to affect the ion's quantum state, a laser to cool and/or enable measurement of the ions, and/or one or more photon detectors to measure the state of the ions. In another instance, superconducting qubits (e.g., such as superconducting quantum interference devices "SQUIDs") can be lithographically defined electronic circuits that can be cooled to milli-Kelvin temperatures to exhibit quantized energy levels (e.g., due to quantized states of electronic charge or magnetic flux). Superconducting qubits can be Josephson junction-based, such as transmon qubits and/or the like. Also, superconducting qubits can be compatible with microwave control electronics, and can be utilized with gate-based technology or integrated cryogenic controls. Additional exemplary qubit technologies can include, but are not limited to: photonic qubits, quantum dot qubits, gate-based neutral atom qubits, semiconductor qubits (e.g., optically gated or electrically gated), topological qubits, a combination thereof, and/or the like.

In one or more embodiments, the communications component 112 can receive one or more target quantum Hamiltonians and/or energy thresholds from the one or more input devices 106 (e.g., via a direct electrical connection and/or through the one or more networks 104) and share the data with the various associate components of the read-out component 110. Additionally, the communications component 112 can facilitate the sharing of data between the read-out component 110 and the one or more quantum computers, and/or vice versa (e.g., via a direct electrical connection and/or through the one or more networks 104).

In one or more embodiments, the energy scale component 114 can truncate the one or more target quantum Hamiltonians based on the one or more energy thresholds. Each energy threshold can define a boundary of an energy scale characterized by the target quantum Hamiltonian. The energy thresholds can be defined via the one or more input devices 106 and shared with the energy scale component 114 via the communications component 112 and/or one or more networks 104. For example, the energy scale component 114 can define N truncated Hamiltonians $H_{\varepsilon_{i-1}\varepsilon_i} = \Sigma_i \alpha_i P_i$, where $\varepsilon_i < |\alpha_i| < \varepsilon_{i-1}$. One of ordinary skill in the art will recognize that the number of energy thresholds, and thereby the number of truncated Hamiltonians associated with respective energy scales, can vary based on the complexity and/or size the of the target quantum Hamiltonian.

Figure 2:
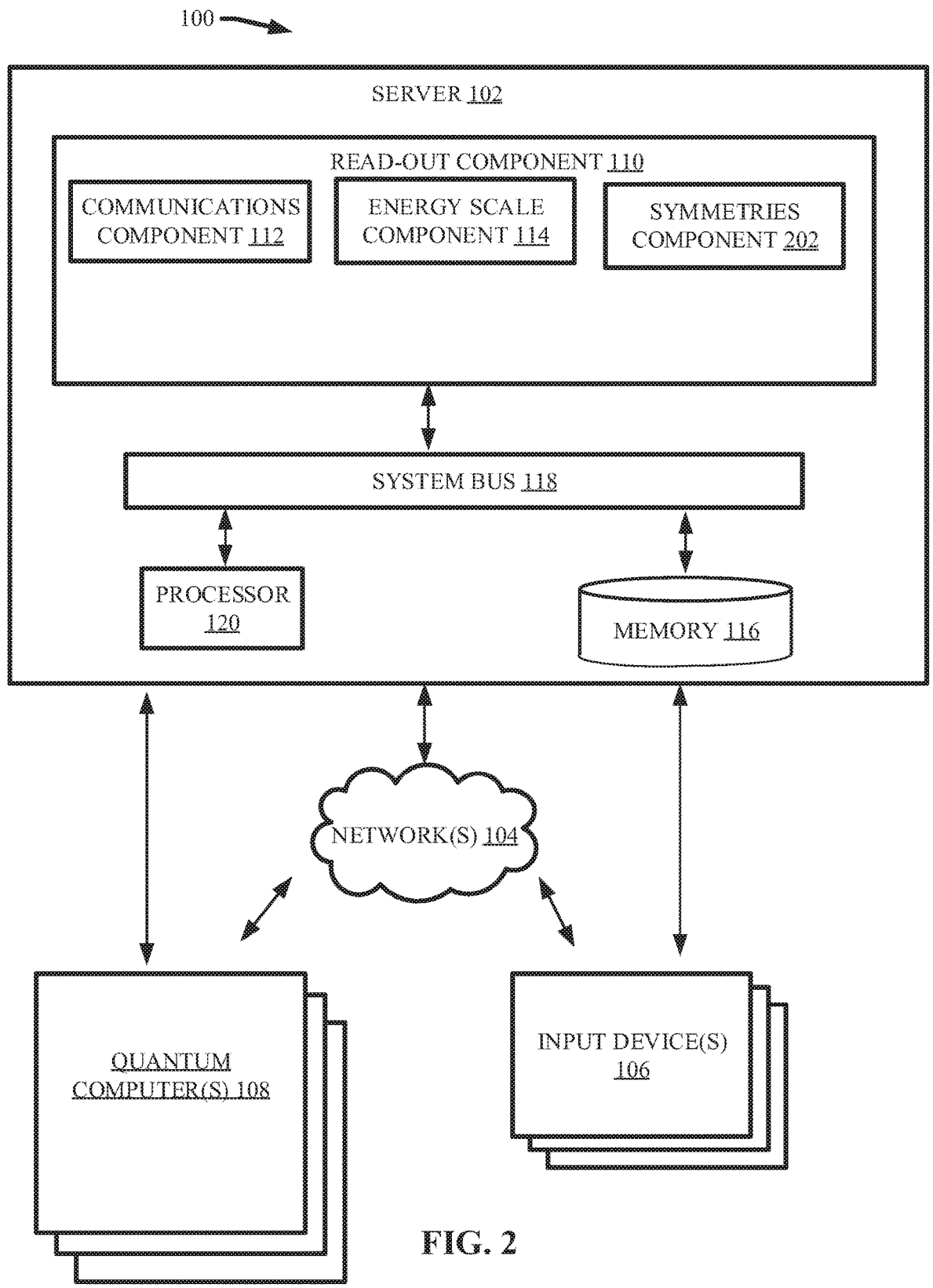
FIG. 2 illustrates a block diagram of an example, non-limiting system that can determine one or more symmetries in a quantum Hamiltonian that emerge at various energy scales to facilitate an implementation of an iterative energy-scaled VQE process in accordance with one or more embodiments described herein.

FIG. 2 illustrates a diagram of the example, non-limiting system 100 further comprising symmetries component 202 in accordance with one or more embodiments described herein. Repetitive description of like elements employed in other embodiments described herein is omitted for sake of brevity. In various embodiments, the symmetries component 202 can determine one or more symmetries that emerge at the various energy scales (e.g., defined by the energy thresholds) by analyzing the truncated Hamiltonians. In other words, one or more symmetries can emerge at each energy scale of the target quantum Hamiltonian; thus, the symmetries component 202 can determine the symmetries by analyzing the truncated Hamiltonians, wherein a symmetry determined from a given truncated Hamiltonian emerges from the associated energy scale.

In one or more embodiments, the symmetries component 202 can determine the presence of one or more symmetries within the truncated Hamiltonians that can enable simulation of the truncated Hamiltonians to be restricted to an eigenspace of the symmetry operator; thereby reducing the number of qubits required to encode the Hamiltonian. Determining the one or more symmetries can enable the removal of qubit resources while preserving a simplified structure of the encoded truncated Hamiltonian (e.g., thereby enabling efficient simulations with fewer required qubits). For example, the one or more symmetries can be present in truncated Hamiltonians that describe molecules with geometric symmetries such as rotations or reflections.

In various embodiments, the one or more symmetries can be $Z_2$ symmetries. For instance, the symmetries component 202 can find $k_i$ $Z_2$ symmetries $s_{i,1} \ldots s_{i,k}$ for each $H_{\varepsilon_{i-1},\varepsilon_i}$. Additionally, in one or more embodiments the symmetries component 202 can determine one or more Clifford unitaries based on the determined symmetries (e.g., the $Z_2$ symmetries). For instance, the symmetries component 202 can find $kg$ Clifford unitaries $C_{i,1} \ldots C_{i,k_i}$ based on the $s_{i,1} \ldots s_{i,k}$ symmetries.

Figure 3:
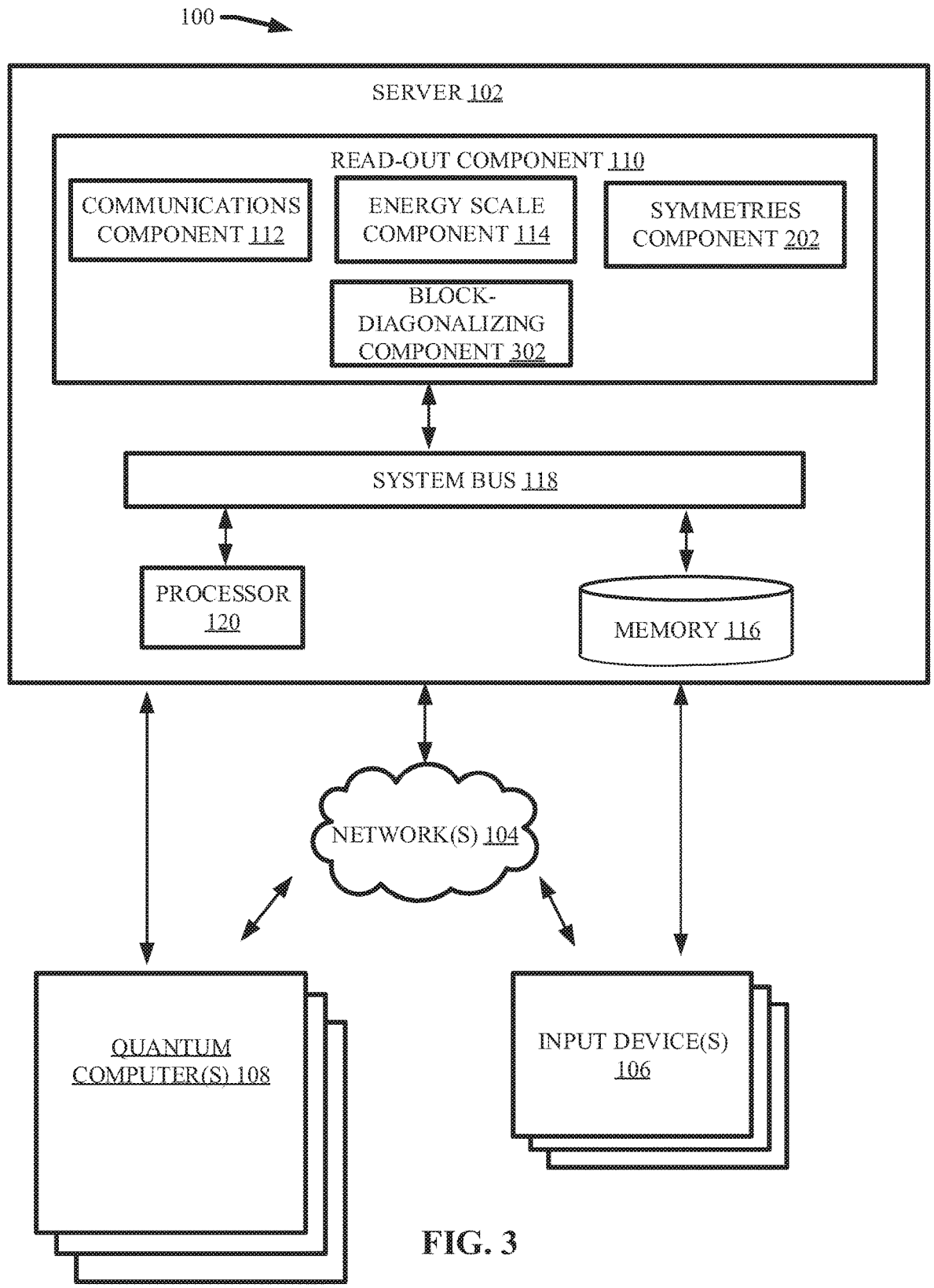
FIG. 3 illustrates a block diagram of an example, non-limiting system that can block-diagonalize one or more truncated quantum Hamiltonians to facilitate implementation of an iterative energy-scaled VQE process in accordance with one or more embodiments described herein.

FIG. 3 illustrates a diagram of the example, non-limiting system 100 further comprising block-diagonalizing component 302 in accordance with one or more embodiments described herein. Repetitive description of like elements employed in other embodiments described herein is omitted for sake of brevity. In various embodiments, the block-diagonalizing component 302 can partition the truncated Hamiltonians into block-diagonal Hamiltonians based on the one or more symmetries and/or Clifford unitaries. For instance, the block-diagonalizing component 302 can compute and/or store N block-diagonalized Hamiltonians $H_{\varepsilon_{i-1},\varepsilon_i}^{BD} = (\Pi_{j=1}^{k_i} C_{ij}) H_{\varepsilon_{i-1},\varepsilon_i}(\Pi_{j=1}^{k_i} C_{ij})$. Thereby, the block-diagonalizing component 302 can transform the one or more truncated Hamiltonians to one or more block-diagonalized Hamiltonians.

Figure 4:
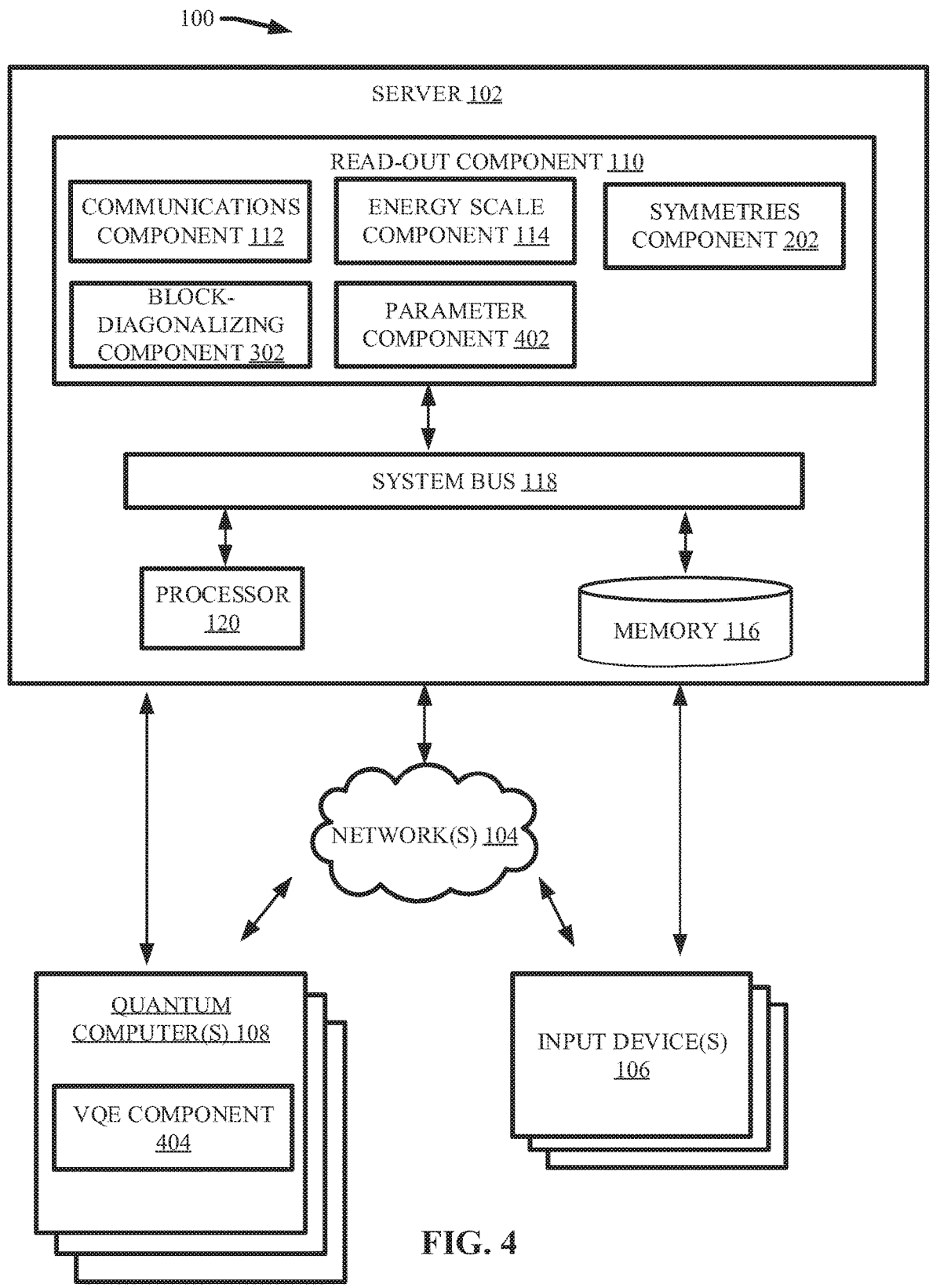
FIG. 4 illustrates a block diagram of an example, non-limiting system can execute one or more VQE algorithms based on symmetries emerging at a given energy scale to facilitate an implementation of an iterative energy-scaled VQE process in accordance with one or more embodiments described herein.

FIG. 4 illustrates a diagram of the example, non-limiting system 100 further comprising parameter component 402 and/or VQE component 404 in accordance with one or more embodiments described herein. Repetitive description of like elements employed in other embodiments described herein is omitted for sake of brevity. In various embodiments, the parameter component 402 and/or VQE component 404 can function in combination to execute an iterative VQE process based on the block-diagonalized Hamiltonians formed using the energy scale based symmetries.

In one or more embodiments, the parameter component 402 can define N variational wavefunctions $|\psi_i(\theta_i)\rangle$ that can act as single-qubit rotations on the one or more qubits that define the blocks of the block-diagonalized Hamiltonians $H_{\varepsilon_{i-1},\varepsilon_i}^{BD}$. Also, the parameter component 402 can initialize the variational quantum parameters $\theta_i$ to reproduce the previous step-wavefunction $|\psi_{i-1}(\theta_{i-1})\rangle$, for any values of $\theta_{i-1}$. Thereby, the initialized variational quantum parameters can be referenced as $\theta_i^0 = \text{Embed}[\theta_{i-1}]$. In one or more embodiments, the initial variational quantum parameters can be sets of embedding variational ansatzes, where trial states can be parameterized by quantum gates that are tailored to the one or more available quantum computers 108.

In one or more embodiments, the parameter component 402 can first determine the variational wavefunction for the block-diagonalized Hamiltonian associated with the energy scale having the lowest energy values of the plurality of energy scales. Thereupon, the parameter component 402 can share (e.g., via the communications component 112 and/or the one or more networks 104) the variational wavefunction and the block-diagonalized Hamiltonian with the VQE component 404 for an initial execution of a VQE algorithm. In one or more embodiments, the VQE algorithm can use Ritz'a variational principle to prepare approximations to the ground state and the ground state energy of the block-diagonalized Hamiltonian. For example, the VQE algorithm can minimize the energy of a qubit Hamiltonian over a class of trial states that can be prepared on a given quantum computer 108 by varying one or more control parameters (e.g., variational quantum parameters).

As shown in FIG. 4, the VQE component 404 can be comprised within the one or more quantum computers 108. For example, the VQE component 404 can be comprised within the control processor plane of the one or more quantum computers 108. In various embodiments, the VQE component 404 can execute a given VQE algorithm on the one or more quantum computers 108 to optimize the variational quantum parameter $\theta_1^*$ for the variational wavefunction $|\psi_1(\theta_1)\rangle$ (e.g., the initial variational wavefunction) for the block-diagonalized Hamiltonian $H_{\varepsilon_0,\varepsilon_1}^{BD}$ (e.g., the block-diagonalized Hamiltonian associated with the lowest energy scale).

The one or more quantum computers 108 can then share the optimized variational quantum parameter $\theta_1^*$ (e.g., via the communications component 112 and/or the one or more networks 104) with the parameter component 402. Subsequently, the parameter component 402 can utilize the optimized variational quantum parameter to define a second variational wavefunction, which can regard a second block-diagonalized Hamiltonian. For example, the second block-diagonalized Hamiltonian can be the block-diagonalized Hamiltonian associated with the energy scale having the second to lowest energy values of the plurality of energy scales. Further, the VQE component 404 can utilize the second variational wavefunction to execute the VQE on the second block-diagonalized Hamiltonian to further optimize the variational quantum parameter. Thereby, the VQE component 404 can iterate execution of the VQE algorithm utilizing one or more variational quantum parameters optimized during the previous execution (e.g., the initial execution) as control parameters for the given execution of the VQE algorithm.

In various embodiments, the VQE component 404 can continue the described feedback loop with the parameter component 402 until the VQE algorithm has been executed on all the block-diagonalized Hamiltonians. For example, the VQE component 404 can execute multiple iterations of the VQE with regards to the plurality of block-diagonalized Hamiltonians (e.g., in sequential order from the block-diagonalized Hamiltonian associated with the lowest energy scale to the block-diagonalized Hamiltonian associated with the highest energy scale), wherein each iteration can utilize variational quantum parameters optimized during the previous iteration of the VQE algorithm.

Upon completing execution of the VQE algorithm on the block-diagonalized Hamiltonian of the highest energy level, the one or more quantum computers 108 can share the optimized variational quantum parameters with the parameter component 402 (e.g., via the communications component 112 and/or the one or more networks 104). The parameter component 402 can then define a final variational wavefunction for the target quantum Hamiltonian using the optimized variational quantum parameters (e.g., optimized through one or more iterations of the VQE, executed on the plurality of block-diagonalized Hamiltonians). Further, parameter component 402 can share the final variational wavefunction (e.g., via the communications component 112 and/or one or more networks 104) with the VQE component 404, whereupon the VQE component 404 can execute the VQE algorithm on the target quantum Hamiltonian using the final variational wavefunction to determine a ground state energy.

FIG. 5 illustrates a diagram of an example, non-limiting procedure 500 that can facilitate implementation of one or more iterative energy-scaled VQEs via one or more systems 100 in accordance with one or more embodiments described herein. Repetitive description of like elements employed in other embodiments described herein is omitted for sake of brevity. Procedure 500 can characterize one or more of the functions delineated in the various embodiments described herein.

For example, as described herein, the input qubit Hamiltonian and energy values can be entered into the system 100 via one or more input devices 106. Further, the energy scale component 114 can define the truncated Hamiltonians delineated in line 1 of procedure 500. Also, the symmetries component 202 can determine the $Z_2$ symmetries and/or Clifford unitaries delineated in lines 2-3 of procedure 500. Additionally, the block-diagonalizing component 302 can compute the block-diagonalized Hamiltonians delineated in line 4 of procedure 500. The parameter component 402 can define the variational wavefunctions as delineated in line 5 of procedure 500. Additionally, the VQE component 404 can execute the VQE algorithm as delineated in line 6 of procedure 500. Lines 7-10 can characterize the feedback loop described herein between the parameter component 402 and the VQE component 404 regarding the multiple iterations of the VQE algorithm on the plurality of block-diagonalized Hamiltonians using control parameters optimized via previous iterations. Moreover, lines 11-13 can delineate how the VQE component 404 can execute the optimized variational quantum parameters on the target quantum Hamiltonian to determine the ground state energy, as described herein in accordance with one or more embodiments.

Figure 6:
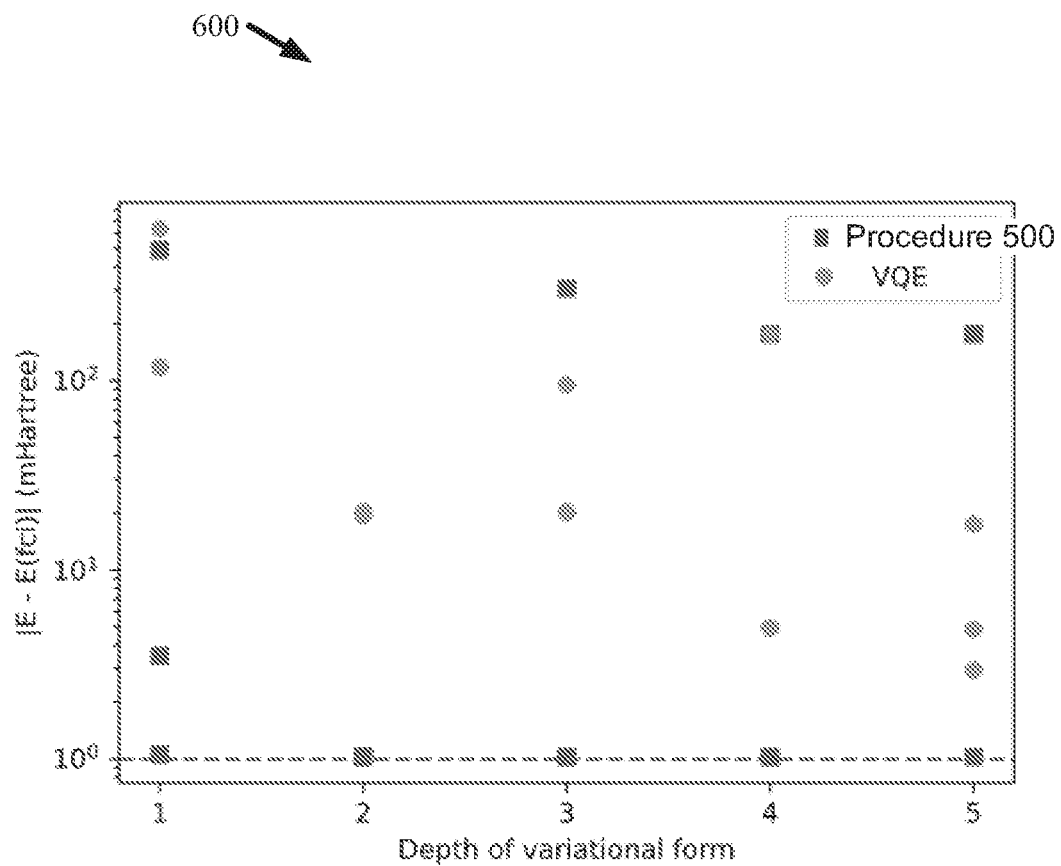
FIG. 6 illustrates a diagram of an example, non-limiting graph that can demonstrate the efficacy of one or more iterative energy-scaled VQE processes in accordance with one or more embodiments described herein.

FIG. 6 illustrates a diagram of an example, non-limiting graph 600 that can depict the efficacy of the one or more iterative energy-scaled VQE processes with regards to an 8-qubit lithium hydride (LiH) Hamiltonian as compared to a conventional VQE process in accordance with one or more embodiments described herein. Repetitive description of like elements employed in other embodiments described herein is omitted for sake of brevity. The numerical results in graph 600 can regard a LiH molecular Hamiltonian defined on 8 superconducting qubits at a molecular distance of 1.6 Angstrom. Additionally, the following energy thresholds were employed:

$\varepsilon_0 = 10^3$ (e.g., constituting an arbitrary large number)
$\varepsilon_1 = 0.0275450848201219$ (e.g., having 6 symmetries)
$\varepsilon_2 = 0.01057876891401711$ (e.g., having 4 symmetries)
$\varepsilon_3 = 0.010319173999268991$ (e.g., having 3 symmetries)
$\varepsilon_4 = 0.0$ (e.g., having 2 symmetries)

As a set of embedding variational ansatzes, the parameter component 402 can consider a quantum circuit of the one or more quantum computers 108 that interleaves parametrized RY and RZ rotation layers with the parametrized controlled rotations on an all-to-all connectivity. A layer of RY and RZ rotations can be applied on all qubits that define the blocks of the block-diagonal Hamiltonians. After the VQE component 404 optimizes at iteration i, at iteration i+1 the parameter component 402 can introduce new entangling controlled rotations initialized as to act as the identity operator.

Graph 600 plots the best energy estimates $E_N^*$ from the procedure 500 compared to standard VQE execution, with varying depths of variational ansatzes used. Graph 600 depicts improvements in accuracy achieved by procedure 500 when considering errors with respect to the exact ground state energy of the target Hamiltonian. Further, dashed line depicted in graph 600 marks the chemical accuracy (e.g., an error of $10^3$ Hartree).

Figure 7:
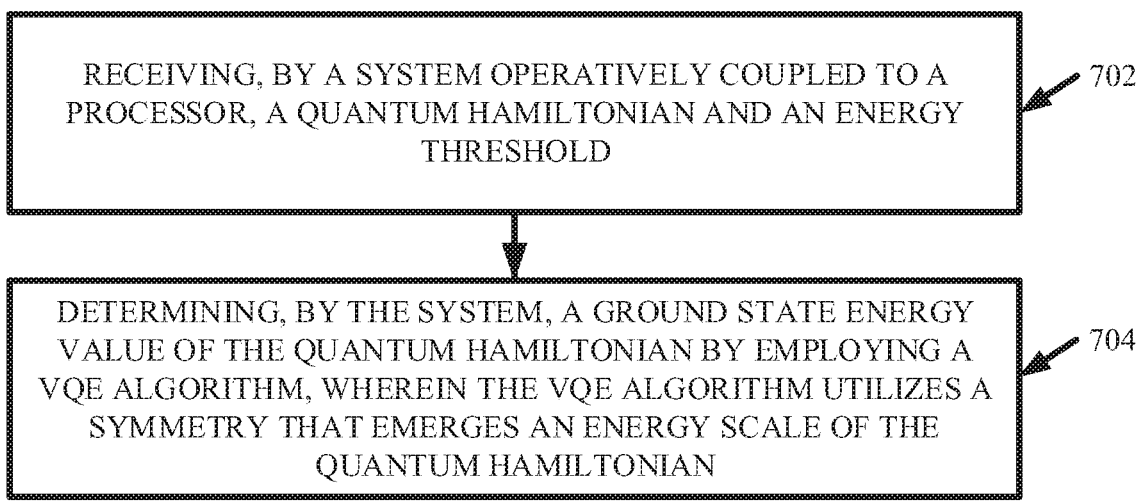
FIG. 7 illustrates a flow diagram of an example, non-limiting computer-implemented method that can facilitate executing one or more iterative energy-scaled VQE processes in accordance with one or more embodiments described herein.

FIG. 7 illustrates a flow diagram of example, non-limiting computer-implemented method 700 that can facilitate implementation of one or more iterative energy-scaled VQE processes (e.g., as characterized by procedure 500) on one or more systems 100 in accordance with one or more embodiments described herein. Repetitive description of like elements employed in other embodiments described herein is omitted for sake of brevity.

At 702, the computer-implemented method 700 can comprise receiving (e.g., via communications component 112), by a system 100 operatively coupled to a processor 120, one or more quantum Hamiltonians and/or one or more energy thresholds. As described herein, the one or more quantum Hamiltonians and/or energy thresholds can be entered into the system 100 via the one or more input devices 106. In various embodiments, the one or more quantum Hamiltonians can regard one or more molecule structures. Also, the number of energy thresholds can vary depending on the size and/or complexity of the molecule structures. In one or more embodiments, the one or more quantum Hamiltonians can comprise a sum of Pauli matrices and/or can be obtained by applying one or more versions of a Jordan-Wigner encoding.

At 704, the computer-implemented method 700 can comprise determining (e.g., via read-out component 110), by the system 100, a ground state energy value of the one or more quantum Hamiltonians by employing one or more VQE algorithms, wherein the one or more VQE algorithms can utilize one or more symmetries that can emerge at one or more energy scales of the one or more quantum Hamiltonians. For example, the determining at 704 can be performed in accordance with procedure 500 described herein.

Figure 8:
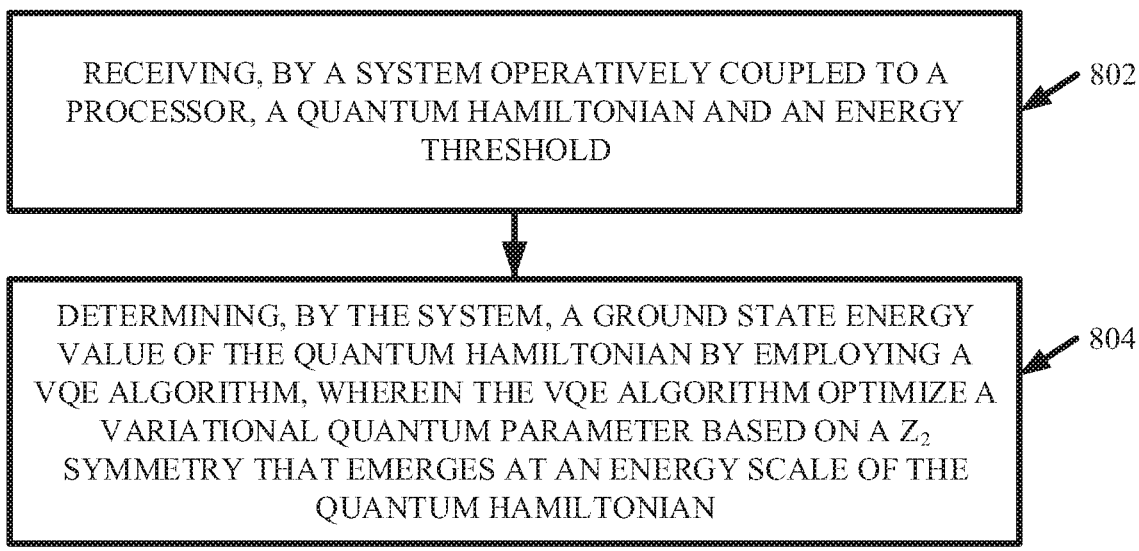
FIG. 8 illustrates a flow diagram of an example, non-limiting computer-implemented method that can facilitate executing one or more iterative energy-scaled VQE processes in accordance with one or more embodiments described herein.

FIG. 8 illustrates a flow diagram of example, non-limiting computer-implemented method 800 that can facilitate implementation of one or more iterative energy-scaled VQE processes (e.g., as characterized by procedure 500) on one or more systems 100 in accordance with one or more embodiments described herein. Repetitive description of like elements employed in other embodiments described herein is omitted for sake of brevity.

At 802, the computer-implemented method 800 can comprise receiving (e.g., via communications component 112), by a system 100 operatively coupled to a processor 120, one or more quantum Hamiltonians and/or one or more energy thresholds. As described herein, the one or more quantum Hamiltonians and/or energy thresholds can be entered into the system 100 via the one or more input devices 106. In various embodiments, the one or more quantum Hamiltonians can regard one or more molecule structures. Also, the number of energy thresholds can vary depending on the size and/or complexity of the molecule structures. In one or more embodiments, the one or more quantum Hamiltonians can comprise a sum of Pauli matrices and/or can be obtained by applying one or more versions of a Jordan-Wigner encoding.

At 804, the computer-implemented method 800 can comprise determining (e.g., via the read-out component 110), by the system 100, a ground state energy value of the one or more quantum Hamiltonians by employing one or more VQE algorithms, wherein the one or more VQE algorithms can optimize one or more variational quantum parameters based on one or more $Z_2$ symmetries that can emerge at one or more energy scales of the one or more quantum Hamiltonians. For example, the determining at 704 can be performed in accordance with procedure 500 described herein.

Figure 9:
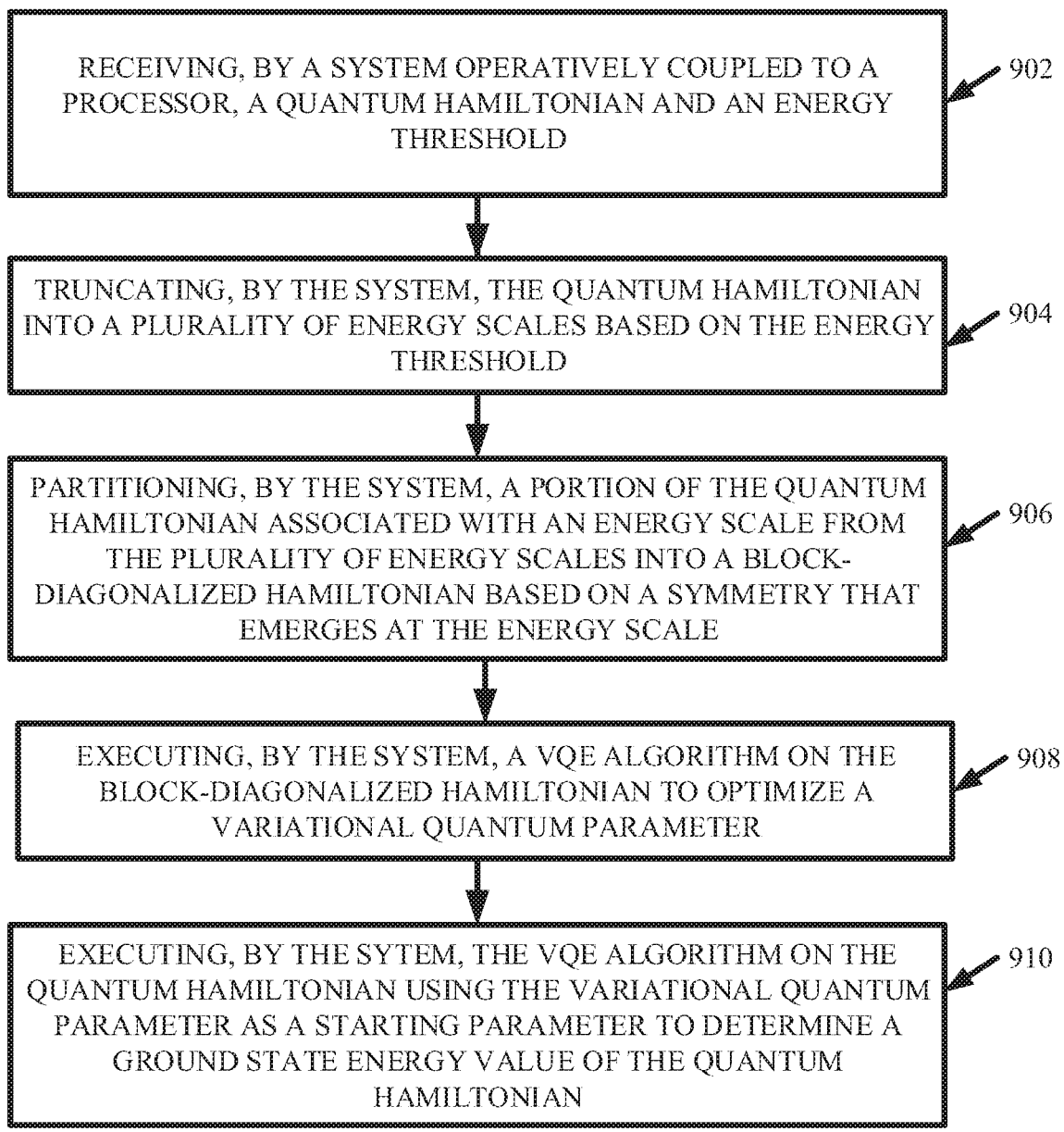
FIG. 9 illustrates a flow diagram of an example, non-limiting computer-implemented method that can facilitate executing one or more iterative energy-scaled VQE processes in accordance with one or more embodiments described herein.

FIG. 9 illustrates a flow diagram of example, non-limiting computer-implemented method 900 that can facilitate implementation of one or more iterative energy-scaled VQE processes (e.g., as characterized by procedure 500) on one or more systems 100 in accordance with one or more embodiments described herein. Repetitive description of like elements employed in other embodiments described herein is omitted for sake of brevity.

At 902, the computer-implemented method 900 can comprise receiving (e.g., via communications component 112), by a system 100 operatively coupled to a processor 120, a quantum Hamiltonians and/or an energy thresholds. As described herein, the quantum Hamiltonian and/or energy threshold can be entered into the system 100 via the one or more input devices 106. In various embodiments, the quantum Hamiltonian can regard one or more molecule structures. In one or more embodiments, the quantum Hamiltonian can comprise a sum of Pauli matrices and/or can be obtained by applying one or more versions of a Jordan-Wigner encoding.

At 904, the computer-implemented method 900 can comprise truncating (e.g., via energy scale component 114), by the system 100, the quantum Hamiltonian into a plurality of energy scales based on the energy threshold. For example, the truncating at 904 can be performed in accordance with line 1 of procedure 500, in accordance with various embodiments described herein.

At 906, the computer-implemented method 900 can comprise partitioning (e.g., via symmetries component 202 and/or block-diagonalizing component 302), by the system 100, a portion of the quantum Hamiltonian associated with an energy scale from the plurality of energy scales into a block-diagonalized Hamiltonian based on one or more symmetries that can emerge at the energy scale. For example, the partitioning at 906 can be performed in accordance with lines 3-4 of procedure 500, in accordance with various embodiments described herein.

At 908, the computer-implemented method 900 can comprise executing (e.g., via parameter component 402 and/or VQE component 404), by the system 100, a VQE algorithm on the block-diagonalized Hamiltonian to optimize one or more variational quantum parameters. For example, the executing the VQE algorithm at 908 can be performed in accordance with lines 5-10 of procedure 500, in accordance with various embodiments described herein. In one or more embodiments, the VQE algorithm can be executed via multiple iterations per block-diagonalized Hamiltonian, as described herein.

At 910, the computer-implemented method 900 can comprise executing (e.g., via parameter component 402 and/or VQE component 404), by the system 100, the VQE algorithm on the quantum Hamiltonian using the one or more variational quantum parameters (e.g., optimized at 908) to determine a ground state energy value of the quantum Hamiltonian. For example, the executing the VQE can be performed in accordance with lines 11-13 of procedure 500, in accordance with various embodiments described herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
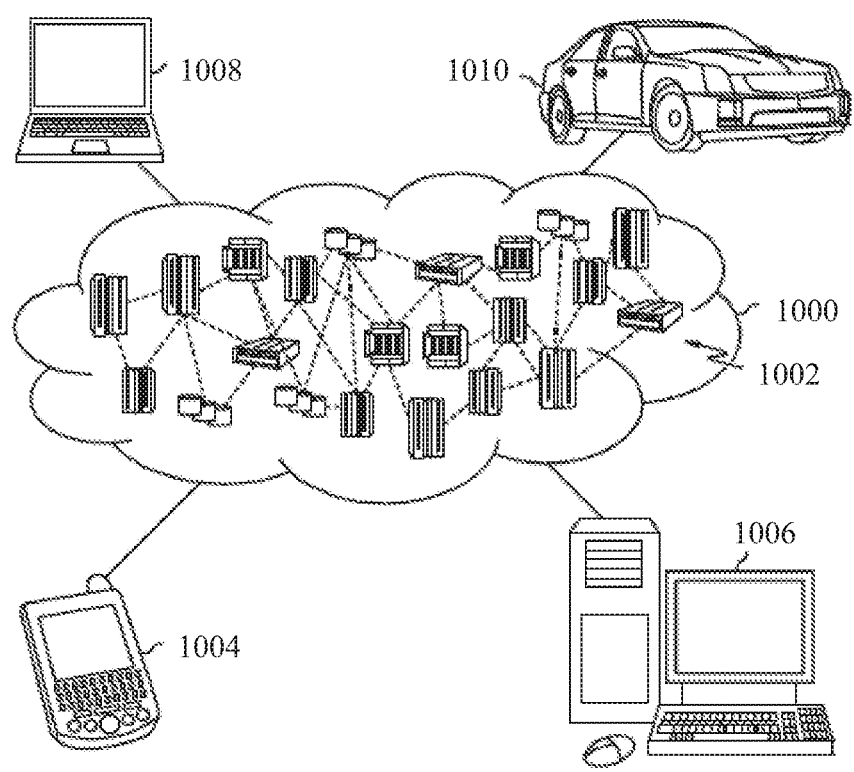
FIG. 10 depicts a cloud computing environment in accordance with one or more embodiments described herein.

Referring now to FIG. 10, illustrative cloud computing environment 1000 is depicted. As shown, cloud computing environment 1000 includes one or more cloud computing nodes 1002 with which local computing devices used by cloud consumers, such as, for example, personal digital assistant (PDA) or cellular telephone 1004, desktop computer 1006, laptop computer 1008, and/or automobile computer system 1010 may communicate. Nodes 1002 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1004-1010 shown in FIG. 10 are intended to be illustrative only and that computing nodes 1002 and cloud computing environment 1000 can communicate with any type of computerized device over any type of network and/or network addressable connection (e.g., using a web browser).

Figure 11:
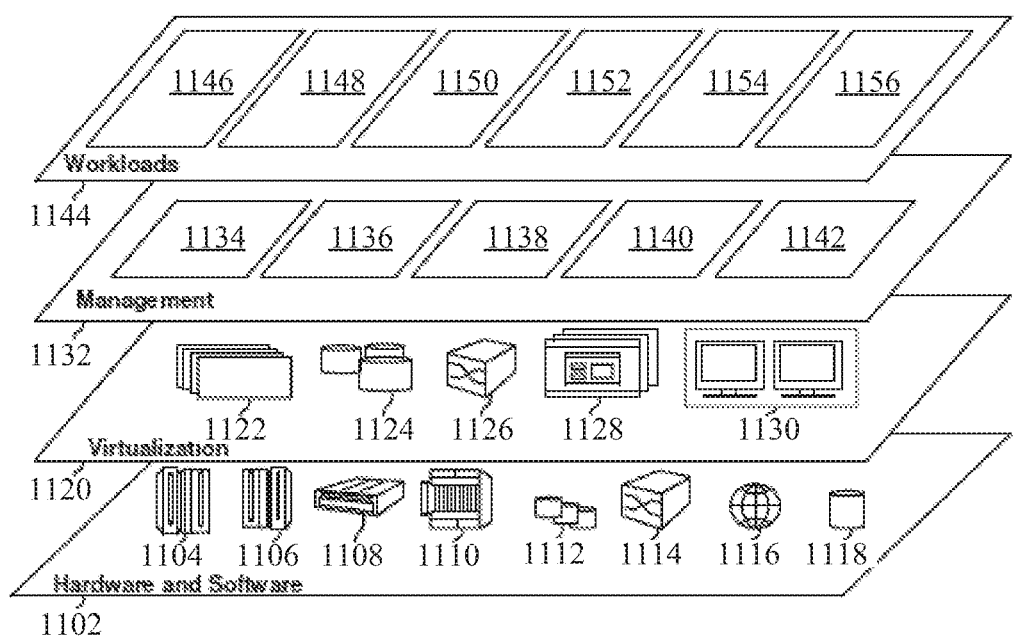
FIG. 11 depicts abstraction model layers in accordance with one or more embodiments described herein

Referring now to FIG. 11, a set of functional abstraction layers provided by cloud computing environment 1000 (FIG. 10) is shown. Repetitive description of like elements employed in other embodiments described herein is omitted for sake of brevity. It should be understood in advance that the components, layers, and functions shown in FIG. 11 are intended to be illustrative only and embodiments of the invention are not limited thereto. As depicted, the following layers and corresponding functions are provided.

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and quantum Hamiltonian processing 1156. Various embodiments of the present invention can utilize the cloud computing environment described with reference to FIGS. 10 and 11 to analyze the one or more quantum Hamiltonians and/or determine the variational wavefunctions for the VQE algorithms.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 12:
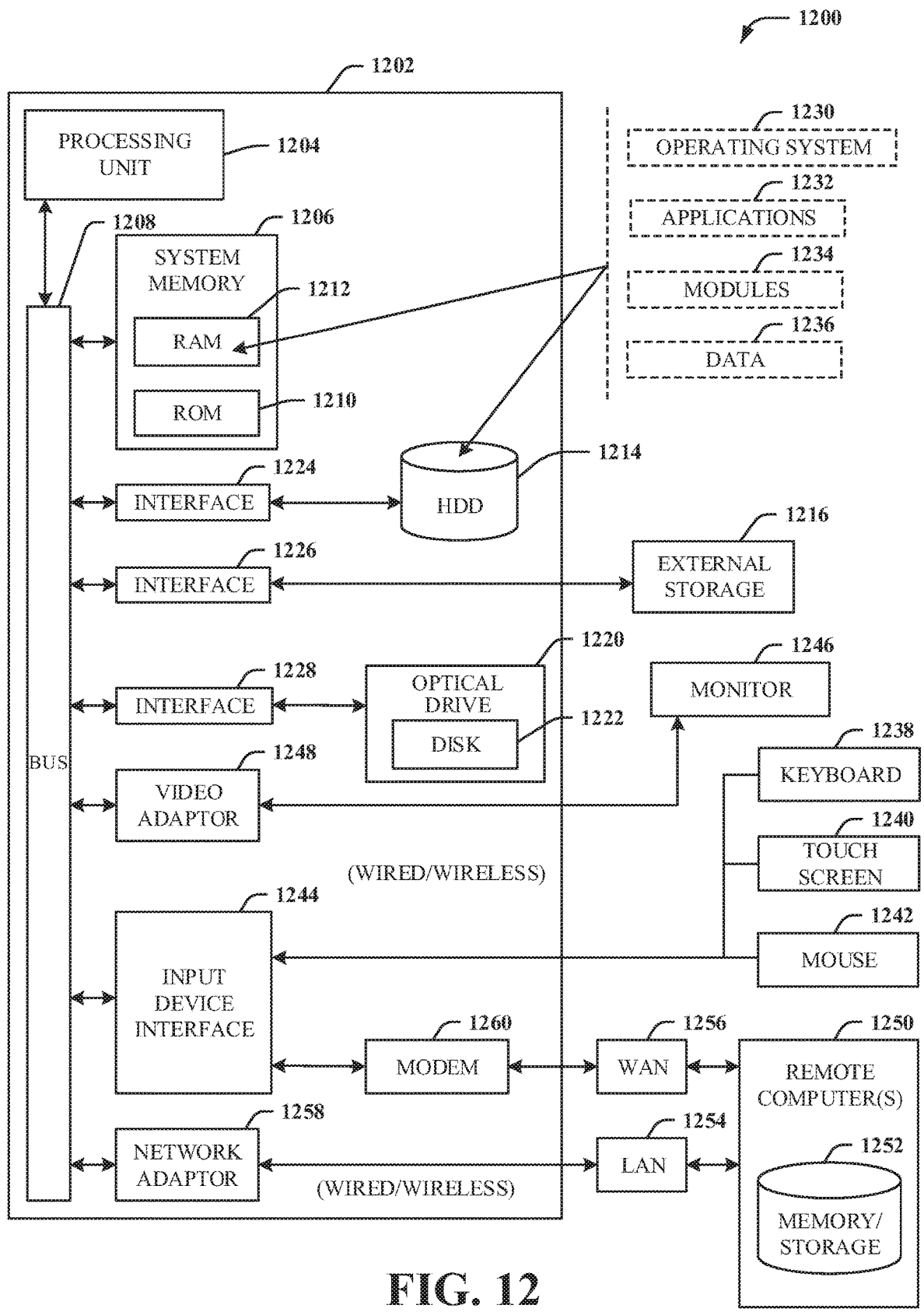
FIG. 12 illustrates a block diagram of an example, non-limiting operating environment in which one or more embodiments described herein can be facilitated.

In order to provide additional context for various embodiments described herein, FIG. 12 and the following discussion are intended to provide a general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things ("IoT") devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory ("RAM"), read only memory ("ROM"), electrically erasable programmable read only memory ("EEPROM"), flash memory or other memory technology, compact disk read only memory ("CD-ROM"), digital versatile disk ("DVD"), Blu-ray disc ("BD") or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system ("BIOS") can be stored in a non-volatile memory such as ROM, erasable programmable read only memory ("EPROM"), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive ("HDD") 1214 (e.g., EIDE, SATA), one or more external storage devices 1216 (e.g., a magnetic floppy disk drive ("FDD") 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive ("SSD") could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus ("USB") and Institute of Electrical and Electronics Engineers ("IEEE") 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine ("VM") of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module ("TPM"). For instance with a TPM, boot components hash next in time boot components, and wait for a match of results to secured values, before loading a next boot component. This process can take place at any layer in the code execution stack of computer 1202, e.g., applied at the application execution level or at the operating system ("OS") kernel level, thereby enabling security at any level of code execution.

A user can enter commands and information into the computer 1202 through one or more wired/wireless input devices 106, e.g., a keyboard 1238, a touch screen 1240, and a pointing device, such as a mouse 1242. Other input devices 106 (not shown) can include a microphone, an infrared ("IR") remote control, a radio frequency ("RF") remote control, or other remote control, a joystick, a virtual reality controller and/or virtual reality headset, a game pad, a stylus pen, an image input device 106, e.g., camera(s), a gesture sensor input device 106, a vision movement sensor input device 106, an emotion or facial detection device, a biometric input device 106, e.g., fingerprint or iris scanner, or the like. These and other input devices 106 are often connected to the processing unit 1204 through an input device 106 interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network ("LAN") 1254 and/or larger networks, e.g., a wide area network ("WAN") 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point ("AP") disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity ("Wi-Fi") and BLUETOOTH® wireless technologies. Thus, the communication can be a predefined structure as with a conventional network or simply an ad hoc communication between at least two devices.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor, operably coupled to the memory, and that executes the computer executable components stored in the memory, wherein the computer executable components comprise:
a read-out component that determines a ground state energy value of a quantum Hamiltonian by iteratively executing, via a quantum computer, a variational quantum eigensolver (VQE) algorithm, wherein an iteration of the VQE algorithm utilizes a symmetry that emerges at an energy scale of the quantum Hamiltonian.

2. The system of claim 1, wherein the read-out component comprises:
an energy scale component that truncates the quantum Hamiltonian into a plurality of energy scales based on respective defined thresholds, wherein the energy scale is comprised within the plurality of energy scales.

3. The system of claim 2, wherein a plurality of symmetries emerge at the plurality of energy scales, wherein the symmetry is comprised within the plurality of symmetries, and wherein the plurality of symmetries are $Z_2$ symmetries.

4. The system of claim 2, wherein the read-out component further comprises:
a symmetries component that determines the symmetry at the energy scale by analyzing a portion of the quantum Hamiltonian associated with the energy scale as defined by the respective defined threshold; and
a block-diagonalizing component that partitions the portion of the quantum Hamiltonian into a block-diagonal Hamiltonian based on the symmetry.

5. The system of claim 4, wherein the read-out component further comprises:
a variational quantum eigensolver component that executes the VQE algorithm on the block-diagonal Hamiltonian via the quantum computer to optimize a variational quantum parameter.

6. The system of claim 5, wherein the symmetries component further determines a second symmetry at a second energy scale from the plurality of energy scales, wherein the block-diagonalizing component further partitions a second portion of the quantum Hamiltonian into a second block-diagonal Hamiltonian based on the second symmetry, and wherein the variational quantum eigensolver component further executes the VQE algorithm on the second block-diagonal Hamiltonian using the variational quantum parameter as a start parameter via the quantum computer to determine an optimal variational quantum parameter.

7. The system of claim 6, wherein the variational quantum eigensolver component further executes the VQE algorithm on the quantum Hamiltonian using the optimal variational quantum parameter as the start parameter via the quantum computer to determine the ground state energy value.

8. A system, comprising:
a memory that stores computer executable components; and
a processor, operably coupled to the memory, and that executes the computer executable components stored in the memory, wherein the computer executable components comprise:
a read-out component that that determines a ground state energy value of a quantum Hamiltonian by iteratively executing, via a quantum computer, a variational quantum eigensolver (VQE) algorithm to optimize a variational quantum parameter based on a $Z_2$ symmetry that emerges at an energy scale of the quantum Hamiltonian.

9. The system of claim 8, wherein the read-out component comprises:
an energy scale component that truncates the quantum Hamiltonian into a plurality of energy scales based on respective defined thresholds, wherein the energy scale is comprised within the plurality of energy scales.

10. The system of claim 9, wherein the read-out component further comprises:
a symmetries component that determines the $Z_2$ symmetry at the energy scale by analyzing a portion of the quantum Hamiltonian associated with the energy scale as defined by the respective defined threshold; and
a block-diagonalizing component that partitions the portion of the quantum Hamiltonian into a block-diagonal Hamiltonian based on the $Z_2$ symmetry.

11. The system of claim 10, wherein the read-out component further comprises:
a variational quantum eigensolver component that executes the VQE algorithm on the block-diagonal Hamiltonian via the quantum computer to determine the variational quantum parameter, wherein the variational quantum eigensolver component further executes the VQE algorithm on the quantum Hamiltonian using the variational quantum parameter as a start parameter to optimize the variational quantum parameter.

12. A computer-implemented method, comprising:
determining, by a system operatively coupled to a processor, a ground state energy value of a quantum Hamiltonian by iteratively executing, via a quantum computer, a variational quantum eigensolver (VQE) algorithm, wherein an iteration of the VQE algorithm utilizes a symmetry that emerges at an energy scale of the quantum Hamiltonian.

13. The computer-implemented method of claim 12, further comprising:
truncating, by the system, the quantum Hamiltonian into a plurality of energy scales based on respective defined thresholds, wherein the energy scale is comprised within the plurality of energy scales.

14. The computer-implemented method of claim 12, further comprising:
  partitioning, by the system, a portion of the quantum Hamiltonian associated with the energy scale into a block-diagonalized Hamiltonian based on the symmetry.

15. The computer-implemented method of claim 14, wherein the iteratively executing comprises:
  executing the VQE algorithm on the block-diagonalized Hamiltonian to optimize a variational quantum parameter; and
  executing the VQE algorithm on the quantum Hamiltonian using the variational quantum parameter as a starting parameter to determine the ground state energy value.

16. A computer-implemented method, comprising:
  determining, by a system operatively coupled to a processor, a ground state energy value of a quantum Hamiltonian by iteratively executing, via a quantum computer, a variational quantum eigensolver (VQE) algorithm to optimize a variational quantum parameter based on a $Z_2$ symmetry that emerges at an energy scale of the quantum Hamiltonian.

17. The computer-implemented method of claim 16, further comprising:
  truncating, by the system, the quantum Hamiltonian into a portion associated with the energy scale based on a defined threshold.

18. The computer-implemented method of claim 17, further comprising:
  partitioning, by the system, the portion of the quantum Hamiltonian into a block-diagonal Hamiltonian based on the $Z_2$ symmetry.

19. The computer-implemented method of claim 18, wherein the iteratively executing comprises:
  executing the VQE algorithm on the block-diagonal Hamiltonian to optimize the variational quantum parameter; and
  executing the VQE algorithm on the quantum Hamiltonian using the variational quantum parameter as a starting parameter to optimize the variational quantum parameter.

20. A computer program product for estimating a ground state energy for a quantum Hamiltonian, the computer program product comprising a computer readable storage medium having program instructions embodied therewith, the program instructions executable by a processor to cause the processor to:
  estimate, by the processor, the ground state energy by iteratively executing, via a quantum computer, a variational quantum eigensolver (VQE) algorithm that uses a set of embedded variational ansatzes computed based on a plurality of $Z_2$ symmetries that emerge at a plurality of energy scales of the quantum Hamiltonian.

21. The computer program product of claim 20, wherein the program instructions further cause the processor to:
  truncate, by the processor, the quantum Hamiltonian into a plurality of sub-Hamiltonians associated with the plurality of energy scales based on respective defined thresholds.

22. The computer program product of claim 21, wherein the program instructions further cause the processor to:
  partition, by the processor, the plurality of sub-Hamiltonians into a plurality of block-diagonal Hamiltonians based on the plurality of $Z_2$ symmetries.

23. The computer program product of claim 22, wherein the iteratively executing comprises:
  execute the VQE algorithm on the plurality of block-diagonal Hamiltonians in a sequence to optimize the set of embedded variational ansatzes.

24. The computer program product of claim 23, wherein the iteratively executing comprises:
  execute, by the quantum computer, the VQE algorithm on the quantum Hamiltonian using the set of embedded variational ansatzes.

25. The computer program product of claim 22, wherein the iteratively executing comprises:
  execute the VQE algorithm on a first block-diagonal Hamiltonian from the plurality of block-diagonal Hamiltonians to determine the set of embedded variational ansatzes; and
  execute the VQE algorithm on a second block-diagonal Hamiltonian from the plurality of block-diagonal Hamiltonians using the set of embedded variational ansatzes to optimize a variational quantum parameter.

* * * * *